(12) United States Patent
Liu et al.

(10) Patent No.: US 8,706,746 B2
(45) Date of Patent: Apr. 22, 2014

(54) METHOD, DEVICE, AND SYSTEM FOR REALIZING FINGERPRINT TECHNOLOGY

(75) Inventors: Haitao Liu, Shenzhen (CN); Rui Wang, Shenzhen (JP)

(73) Assignee: Huawei Technologies Co., Ltd., Shenzhen (CN)

( * ) Notice: Subject to any disclaimer, the term of this patent is extended or adjusted under 35 U.S.C. 154(b) by 335 days.

(21) Appl. No.: 12/840,305

(22) Filed: Jul. 21, 2010

(65) Prior Publication Data

US 2010/0287169 A1 Nov. 11, 2010

Related U.S. Application Data

(63) Continuation of application No. PCT/CN2008/073851, filed on Dec. 30, 2008.

(30) Foreign Application Priority Data

Jan. 24, 2008 (CN) .......................... 2008 1 0026009

(51) Int. Cl.
*G06F 17/30* (2006.01)
(52) U.S. Cl.
USPC ............................ 707/758; 707/610; 707/617
(58) Field of Classification Search
USPC ................................ 707/791, 610, 617, 758
See application file for complete search history.

(56) References Cited

U.S. PATENT DOCUMENTS

| | | | | |
|---|---|---|---|---|
| 6,393,438 B1 * | 5/2002 | Kathrow et al. | ................ | 705/54 |
| 7,478,113 B1 * | 1/2009 | De Spiegeleer et al. | .............. | 1/1 |
| 7,555,489 B2 * | 6/2009 | Bell et al. | .............................. | 1/1 |
| 7,676,506 B2 * | 3/2010 | Reinsch | ........................ | 717/169 |
| 7,827,146 B1 * | 11/2010 | De Landstheer et al. | ..... | 707/651 |
| 7,844,774 B2 * | 11/2010 | Ellard | .......................... | 711/108 |
| 2002/0038296 A1 | 3/2002 | Margolus et al. | | |
| 2004/0143713 A1 | 7/2004 | Niles et al. | | |
| 2005/0060643 A1 * | 3/2005 | Glass et al. | ................ | 715/501.1 |
| 2006/0089954 A1 | 4/2006 | Anschutz | | |
| 2006/0101069 A1 * | 5/2006 | Bell et al. | .................. | 707/103 R |
| 2007/0112882 A1 * | 5/2007 | Tysowski et al. | ............. | 707/201 |
| 2007/0276836 A1 * | 11/2007 | Chatterjee et al. | .............. | 707/10 |

(Continued)

FOREIGN PATENT DOCUMENTS

| | | |
|---|---|---|
| CN | 1561026 A | 1/2005 |
| CN | 1851659 A | 10/2006 |

(Continued)

OTHER PUBLICATIONS

Search Report of corresponding European Patent Application No. 08871856.4, mailed on Feb. 1, 2011, 5 pages total.

(Continued)

*Primary Examiner* — Thanh-ha Dang
(74) *Attorney, Agent, or Firm* — Leydig, Voit & Mayer, Ltd.

(57) ABSTRACT

A method, a device, and a system for realizing a fingerprint technology are provided. The method includes: based on a predetermined rule, determining whether a fingerprint corresponding to a data element needs to be generated. If it is determined that the corresponding fingerprint needs to be generated, fingerprint calculation is performed for the data element, and the obtained fingerprint is sent to a data receiver. If it is determined that the corresponding fingerprint does not need to be generated, the data element is sent to the data receiver. Therefore, fingerprint calculation for data elements with short lengths and unnecessary data transmission during a data synchronization (DS) process can be avoided, and the efficiency of the DS is improved.

15 Claims, 4 Drawing Sheets

(56) References Cited

U.S. PATENT DOCUMENTS

| | | | | |
|---|---|---|---|---|
| 2007/0285815 A1* | 12/2007 | Herre et al. | ............ | 360/13 |
| 2009/0157802 A1 | 6/2009 | Kang et al. | | |
| 2009/0265396 A1* | 10/2009 | Ram et al. | ............ | 707/204 |
| 2011/0282471 A1* | 11/2011 | Herre et al. | ............ | 700/94 |

FOREIGN PATENT DOCUMENTS

| | | | |
|---|---|---|---|
| CN | 1971562 | A | 5/2007 |
| CN | 101009516 | A | 8/2007 |
| EP | 1983662 | A1 | 10/2008 |
| JP | 2003345708 | A | 12/2003 |
| WO | 2007087746 | A1 | 8/2007 |

OTHER PUBLICATIONS

OMA-TS-DS_Protocol-V2_0-20070827-D.
OMA-TS-SyncML_RepPro-V1_2_1-20070612-A.
International search report for International patent application No. PCT/CN2008/073851, dated Apr. 9, 2009.
Office action issued in corresponding Chinese patent application No. 200810026009.4 , dated Nov. 23, 2011 and English translation thereof, total Only 11 pages showed on record.
Written Opinion issued in corresponding PCT application No. PCT/CN2008/073851, dated Apr. 9, 2009, total 5 pages.
Notice of Rejection issued in corresponding Japanese patent application 2010-543362, dated Nov. 20, 2012,and English translation thereof, total 5 pages.
2nd office action issued in corresponding Chinese patent application 200810026009.4, dated Sep. 24, 2012, and English translation thereof, total 21 pages.
$1^{st}$ Office Action in corresponding European Patent Application No. 08871856.4 (Jul. 18, 2013).
$2^{nd}$ Office Action in corresponding Japanese Patent Application No. 2010-543362 (Jul. 9, 2013).

* cited by examiner

METHOD, DEVICE, AND SYSTEM FOR REALIZING FINGERPRINT TECHNOLOGY

CROSS-REFERENCE TO RELATED APPLICATIONS

This application is a continuation of International Application No. PCT/CN2008/073851, filed on Dec. 30, 2008, which claims priority to Chinese Patent Application No. 200810026009.4, filed on Jan. 24, 2008. Both of the applications are hereby incorporated by reference in their entireties.

FIELD OF THE INVENTION

The present invention relates to data synchronization technology, and more particularly to a method, a system, a data sending device, and a data receiving device for realizing a fingerprint technology.

BACKGROUND OF THE INVENTION

Modern society is an information society. A user is able to receive and send information at any time and at any place, and is able to execute application programs with a handheld device. The results of the data interchange and the application program execution might need to be stored in the handheld device, and they might also need to be consistent with the data of the same type in other devices. That is, when the data in one device changes, it is desirable that the corresponding data in other devices is changed accordingly. This is called data synchronization (DS).

A so-called "fingerprint" method is used in the DS technology. A fingerprint is a value obtained from a set of data processed through a certain algorithm Any change of the data result in a change in its fingerprint, and thus fingerprints can effectively identify the change of data. From a single data element to a database, corresponding fingerprint(s) may be generated. One application of the fingerprints is that, for example, a server may use them to determine whether the data received from a terminal is the same as the data stored on the server itself. No matter whether it's the data on the server or the data on the terminal that has changed, the fingerprints of the data would be different. If a received fingerprint is the same as the stored fingerprint, the data on the server and on the terminal are the same, and, in some cases, the terminal does not need to send the data to the server. If the fingerprints are different, the data has changed. At this time, a collision detection strategy is applied to solve the conflict. If the data on the server is to be based on, then the terminal does not need to send the changed data. Thus, by comparing the fingerprints, some unnecessary data transmission can be avoided, and therefore, the traffic load of the server-terminal communication link can be reduced. In addition, fingerprints may also be used in other applications such as resumable downloading.

Figure 1:
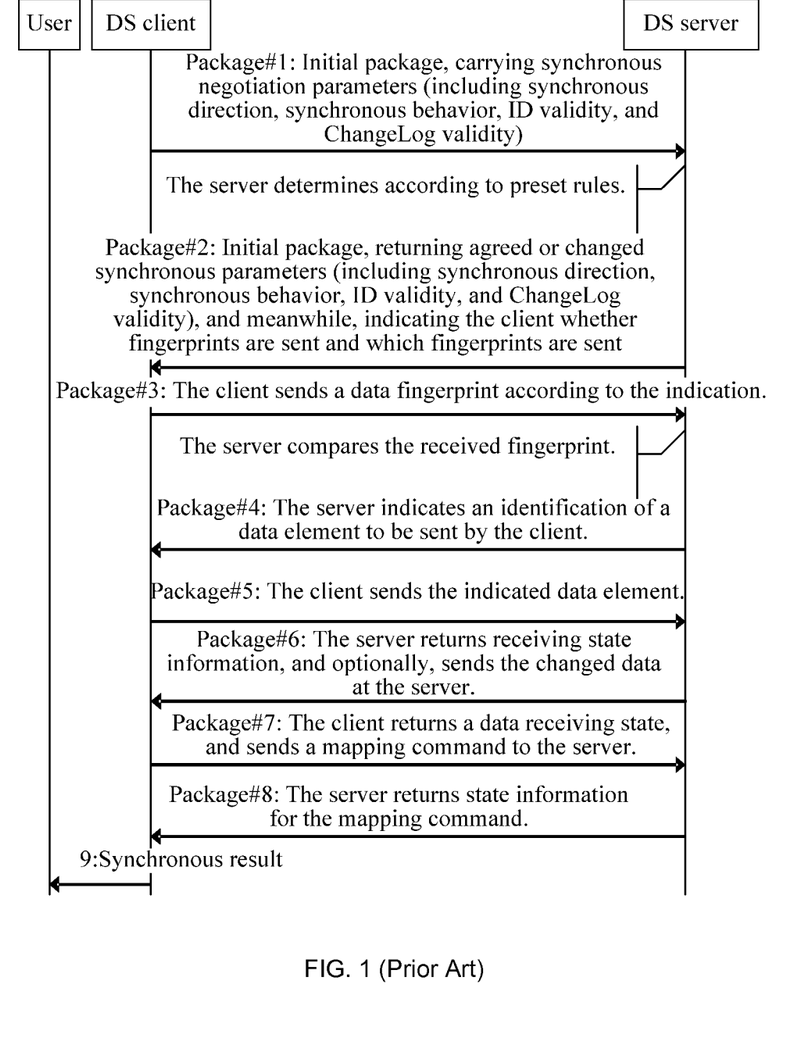
FIG. 1 is a flow chart of a process for realizing a fingerprint technology in the prior art.

Various algorithms may be adopted for fingerprint calculations. An algorithm negotiation is needed to make both of the communicating parties use the same algorithm. In the negotiation, one party sends a set of supported algorithms to the other party, and the other party finds the supported fingerprint algorithm within the set and notifies the peer party, thus completing the algorithm negotiation. A currently used DS flow that employs the fingerprint technology is shown in FIG. 1.

1) A negotiation between the server and the client over the fingerprint use manner is included in PKG (package) 1 and PKG 2.

2) The identifier (ID) and the fingerprint of the data are sent from the client to the server in PKG 3.

3) After receiving the PKG 3, the server compares the fingerprint with a corresponding fingerprint it stores, and indicates to the client in PKG 4 an identification of a data element that needs to be sent by the client.

4) After receiving the PKG 4, the client sends the required data element via PKG 5 according to the instructions of the server.

5) After receiving the PKG 5, the server returns information about a receiving state via PKG 6, and optionally sends the data changed by the server.

In the conception of the present invention, the inventors found that the existing fingerprint technology has the following drawbacks.

The purpose of using the fingerprints is to replace a long data element with a short fingerprint, therefore reducing the amount of data bits to be transmitted. However, it is found that some fingerprints obtained through certain algorithms are actually longer than the corresponding data elements, rendering the fingerprint calculation and transmission meaningless. In that case, if the fingerprints are calculated and sent instead of the data, the calculation load of the device (especially a client device) would increase unnecessarily. Moreover, an additional interaction between the client and the server may occur for certain data, thus wasting air interface resources. Currently, no solution has been proposed to overcome the above drawbacks.

SUMMARY OF THE INVENTION

The present invention is directed to a method, a system, a data sending device, and a data receiving device for realizing a fingerprint technology, so as to avoid fingerprint calculation for data elements with short lengths and to avoid unnecessary data transmission during the DS. Therefore, the efficiency of the DS may be improved.

In an embodiment, the present invention provides a method for realizing a fingerprint technology. The method includes the following steps:

determining whether a length value of a data element is greater than or equal to a minimum length value; and if the length value of the data element is greater than or equal to the minimum length value, calculating a fingerprint for the data element, and sending the obtained fingerprint to a data receiver; or if the length value of the data element is smaller than the minimum length value, sending the data element to the data receiver.

In an embodiment, the present invention further provides a method for realizing a fingerprint technology. The method includes the following steps:

receiving a data item from a data sender;

determining whether the data item is a fingerprint or a data element based on one or more preset rules; and if the data item is a fingerprint, comparing the fingerprint with a stored fingerprint, and subsequent processes are implemented according to the comparison result, or if the data item is a data element, comparing the data element with a stored data element, and subsequent processes are implemented according to the comparison result.

In an embodiment, the present invention further provides a data sending device. The data sending device includes a determining module, a fingerprint calculating module, and a data sending module.

The determining module is configured to determine whether a length value of a data element is greater than or equal to a preset minimum length value.

The fingerprint calculating module is configured to generate a fingerprint corresponding to the data element when the determining module determines that the length value of the data element is greater than or equal to the minimum length value.

The data sending module is configured to send the fingerprint generated by the fingerprint calculating module to a data receiving device; or send the data element to the data receiving device when the determining module determines that the length value of the data element is smaller than the minimum length value.

Accordingly, in an embodiment, the present invention further provides a data receiving device, which includes a data storing module, a data receiving module, a data determining module, and a data processing module.

The data storing module is configured to store a data element or a fingerprint. The data element or the fingerprint is used to compare with a received data element or a received fingerprint.

The data receiving module is configured to receive a data item sent by a data sending device.

The data determining module is configured to determine whether the data item received by the data receiving module is a fingerprint or a data element based on one or more preset rules.

The data processing module is configured to compare the received fingerprint with the stored fingerprint when the data determining module determines that the received data item is the fingerprint, and implement subsequent processes according to a comparison result; or to compare the received data element with stored data element when the data determining module determines that the received data item is the data element, and implement subsequent processes according to a comparison result.

In an embodiment, the present invention further provides a system for realizing a fingerprint technology. The system includes a data sending device and a data receiving device.

The data sending device is configured to determine whether a length value of a data element is greater than or equal to a minimum length value, wherein if the length value of the data element is greater than or equal to the minimum length value, fingerprint calculation is performed for the data element, and an obtained fingerprint is sent to the data receiving device; or if the length value of the data element is smaller than the minimum length value, the data element is sent to the data receiving device.

The data receiving device is configured to receive a data item from the data sending device, and determine whether the data item is a fingerprint or a data element based on one or more preset rules. If the data item is a fingerprint, the fingerprint is compared with a stored fingerprint, and subsequent processes are implemented according to a comparison result. If the data item is a data element, the data element is compared with a stored data element, and subsequent processes are implemented according to a comparison result.

The embodiments of the present invention have the following beneficial effects:

By presetting a minimum length value for the data element that requires fingerprint calculation, whether a fingerprint needs to be generated for the data element is determined, and whether the fingerprint or the data element is sent is determined accordingly. In this way, fingerprint calculation for those data elements with short lengths is avoided, and undesired data transmission during the DS is eliminated, and therefore, the efficiency of the DS is improved.

BRIEF DESCRIPTION OF THE DRAWINGS

To make the technical solutions under the present invention clearer, the accompanying drawings for illustrating the embodiments of the present invention or the prior art are briefly described below. Apparently, the drawings are for the illustration purpose only, and persons having ordinary skill in the art may derive other drawings without creative effort.

DETAILED DESCRIPTION OF THE EMBODIMENTS

The following detailed description is directed to the technical solutions of the present invention with reference to the accompanying drawings. However, the embodiments to be described are only some exemplary embodiments of the present invention. Persons having ordinary skill in the art may derive other embodiments from the embodiments given herein without creative effort, and all such embodiments are intended to be covered in the protection scope of the present invention.

In the embodiments, the present invention provides a method and a system for realizing a fingerprint technology, as well as a data sending device and a data receiving device, so as to avoid fingerprint calculation for data elements with short lengths, eliminate undesired data transmission during the DS, and improve the efficiency of the DS.

Figure 2:
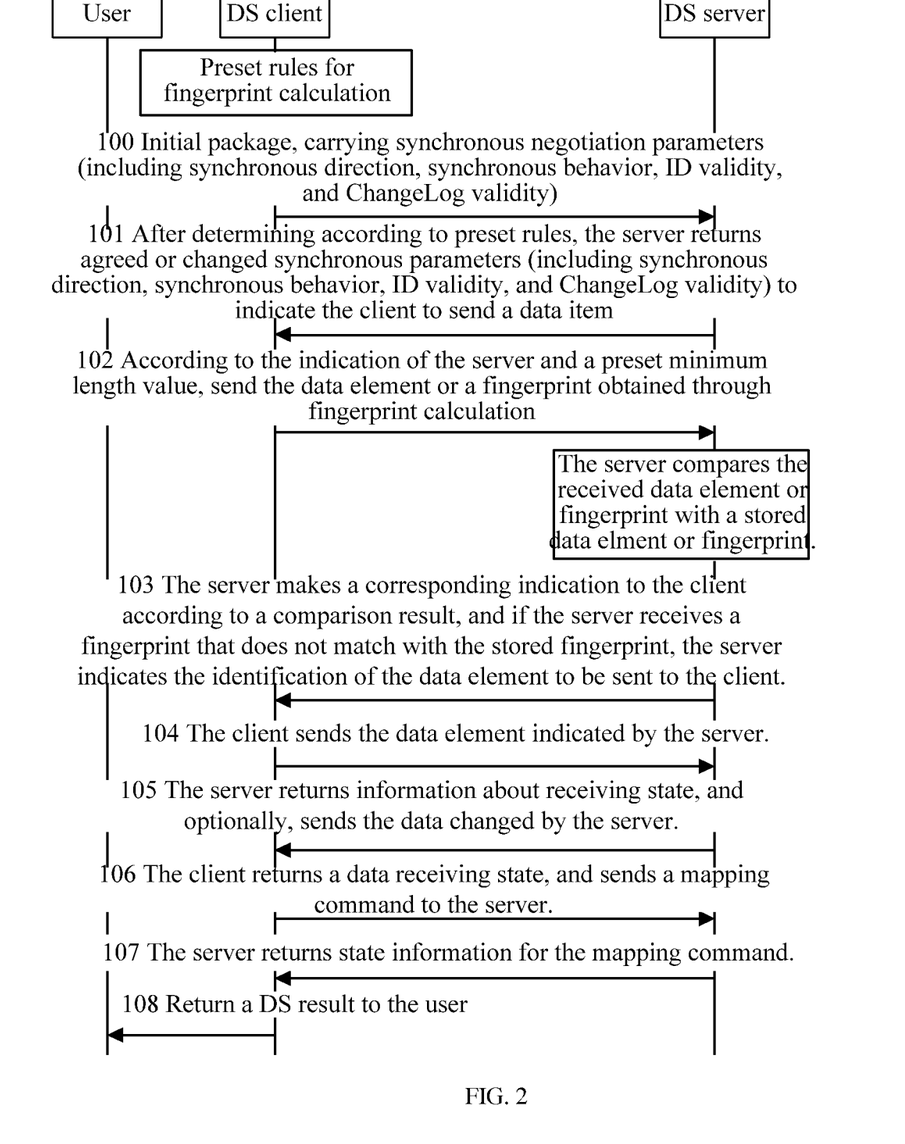
FIG. 2 is a flow chart of a process for realizing a fingerprint technology according to an embodiment of the present invention.

FIG. 2 is a flow chart of a process for realizing the fingerprint technology according to a first embodiment of the present invention.

The embodiment is described by assuming a client and a server as two sides of the communication, that is, the client serves as a data sender, and the server serves as a data receiver.

Firstly, a minimum length value is preset on the client, indicated by an identifier FPLimit. FPLimit is an integer, which indicates that a fingerprint calculation is performed for a data element only when the length of the data element is longer than or equal to a length specified by the FPLimit. If the FPLimit does not exist, the fingerprint calculation is performed for all data elements. This identifier is stored in Device Info of the client device, and Schema may be similar to:

```
<xs:element name="FPLimit"type="xs:int"minOccurs="0"/>
```

The identifier may also be stored in DS MO, and at this time, a newly-added tree structure in the DS MO is as follows:

A minimum length of the data element that requires a fingerprint calculation is recorded in the FPLimit.

| <x>/FP | | | |
|---|---|---|---|
| State | Number of Occurrence | Format | Access mode |
| Needed | 1 | Node | Acquire |

<x>/FP is an intermediate node, which records fingerprint-related information of the DS client.

| <x>/FP/FPLimit | | | |
|---|---|---|---|
| State | Number of Occurrence | Format | Access mode |
| Needed | 0 or 1 | Integer | Acquire |

The node, <x>/FP/FPLimit, defines the minimum length of the data element that requires fingerprint calculation during the DS process.

In a step 100, the client sends PKG 1 to the server. The PKG 1 is an initialization package. The information it carries includes synchronization negotiation parameters, such as synchronization direction, synchronization behavior, ID validity, and ChangeLog validity. It is well known to persons skilled in the art, and the details will not be given herein anymore. In the embodiment of the present invention, the PKG 1 sent by the client to the server further includes the FPLimit.

In a step 101, the server receives the PKG 1 and stores the FPLimit. After determining based on preset rules, the server returns agreed or changed synchronization parameters, including synchronization direction, synchronization behavior, ID validity, ChangeLog validity, and so on, and instructs the client to send data items.

In a step 102, according to the server's instructions and the preset minimum length value, the client determines whether the length value of a data element to be sent is greater than or equal to the preset minimum length value. If the length value of the data element is greater than or equal to the preset minimum length value, a corresponding fingerprint with a preset fingerprint length is generated based on the data element, that is, fingerprint calculation is performed for the data element, and the obtained fingerprint with the preset fingerprint length is sent to the server. If the length value of the data element is smaller than the preset minimum length value and larger or smaller than the preset fingerprint length, the data element (the data item is the data element itself) is directly sent to the server. If the length value of the data element is equal to the preset fingerprint length, one or more data bytes such as zeros are added to the data element to make its length value equal to the preset minimum length value, and then the data item derived from adding zeros to the data element is sent to the server.

After the server receives the data item from the client, if the length of the received data item is shorter than the preset fingerprint length, or is longer than the preset fingerprint length but shorter than the preset minimum length value, it can be directly determined that the data item is the data element, and the data element is directly compared with the corresponding data element stored on the server. If the data item length equals the preset fingerprint length, the data item is compared with the fingerprint of the corresponding data element on the server. If the data item length equals the preset minimum length value, the data item is truncated to the preset fingerprint length value to gain the data element, and the data element is compared with the corresponding data element stored on the server.

The data item determined to be the data element is compared with the data element stored on the server. If the two data elements are the same, it indicates that the data element on the server and the data element on the client are the same, and the client does not need to send the data element. If the two data elements are different, it indicates that the data element is changed. At this time, a collision detection strategy is checked by the server, and if the data element on the server is to be based on according to the collision detection strategy, the server does not need to update the data. If the data element on the client is to be based on according to the collision detection strategy, the server updates the stored data according to the data element sent by the client.

The data item determined to be the fingerprint is compared with the fingerprint on the server, and subsequent processes are implemented. If the two fingerprints are the same, it indicates that the data element on the server and the data element on the client are the same, and the client does not need to send the data element. If the two fingerprints are different, it indicates that the data element is changed. At this time, a collision detection strategy is checked by the server, and if the data element on the server is to be based on, the client does not need to send the data element either. If the data element on the client is to be based on, in a step 103, the server instructs the client to send the data element. In this manner, some unnecessary data transmission can be avoided by comparing the fingerprints, and thus the traffic load is reduced.

Alternatively, an identifier FPFlag may be added to the data item sent by the client to the server. FPFlag is an integer. If FPFlag=0, it indicates that the data element is to be sent. If FPFlag≠0, it indicates that the fingerprint of the data item is to be sent. Different values of FPFlag may be adopted to identify different fingerprint algorithms.

It should be noted that, the set of the fingerprint algorithms supported by both the client and the server may be pre-determined through negotiation. In this case, the newly-added structure in DS MO is as follows.

| <x>/FP/<x> | | | |
|---|---|---|---|
| State | Number of Occurrence | Format | Access mode |
| Needed | One or more | Node | Acquire |

<x>/FP/<x> is an intermediate node, which records one or more fingerprint algorithms supported by the DS client.

<x>/FP/<x>/Algorithm

| State | Number of Occurrence | Format | Access mode |
|---|---|---|---|
| Needed | 1 | Integer | Acquire |

<x>/FP/<x>/Algorithm is a leaf node. It records the fingerprint algorithms supported by the DS client. The following is the definitions of the numbers.

| Value | Description |
|---|---|
| 1 | Changed Log |
| 2 | Changed Count |
| 3 | Hash |
| 4 | Partial Fingerprint Calculation is performed for data elements (Sub-Item specific) |

Of course, the information may also be stored in the Device Info. The following is the Schema of a fingerprint generation algorithm:

<xs:element name="FPAlgorithm"type="xs:integer"/>

The values are configured to indicate the types of the fingerprint algorithms, and the definitions of the values may be the same as those in the above table.

It should be noted that, during the DS, the client and the server select a sub-set of fingerprint algorithms supported by both sides from the set of supported fingerprint algorithms. When fingerprint calculation is needed for the data element on the client, a fingerprint algorithm is selected from the sub-set to perform the calculation, and this algorithm is identified by the FPFlag. The obtained fingerprint is sent to the server.

After receiving the data item from the client, the server determines whether the data item is a fingerprint or a data element according to the identifier FPFlag of the data item. If the server receives a data element, the data element is compared with the stored data element, and subsequent processes are implemented according to the comparison result. If the two data elements are the same, it indicates that the data element on the server and the data element on the client are the same, and the server does not need to update the data element. If the two data elements are different, it indicates that the data element is changed. At this time, a collision detection strategy is checked by the server, and if the data element on the server is to be based on, the server does not need to update the data element either. If the data element on the client is to be based on, the server updates the stored data element according to the data element sent by the client.

If the server receives a fingerprint, the server compares the received fingerprint and the stored fingerprint, and subsequent processes are implemented according to the comparison result. If the two fingerprints are the same, it indicates that the data element on the server and the data element on the client are the same, and the client does not need to send the data element. If fingerprints are different, it indicates that the data element is changed. At this time, a collision detection strategy is checked by the server, and if data element on the server is to be based on, the client does not need to send the data element either. If the data element on the client is to be based on, in the step 103, the server indicates an identification of the data element that needs to be sent by the client.

In a step 104, the client sends the data element indicated by the server.

In a step 105, the server returns information about a receiving state to the client, and optionally, returns the changed data.

In a step 106, the client returns a data receiving state to the server, and sends a mapping command to the server.

In a step 107, the server returns state information for the mapping command to the client.

In a step 108, the client returns a DS result to a user of the client.

In the method for realizing a fingerprint technology provided by the embodiment of the present invention, by presetting a minimum length value for the data element that requires fingerprint calculation, whether a corresponding fingerprint needs to be generated for a data element is determined, and whether the fingerprint or the data element is to be sent is determined accordingly. Moreover, an identifier is set for each data item to notify the receiving party whether a fingerprint or a data element is sent, and to notify the receiving party of the used fingerprint algorithm. In this way, fingerprint calculation for data elements with short lengths and undesired data transmission during the DS are avoided, and the efficiency of the DS is improved.

Also referring to FIG. 2, a method for realizing a fingerprint technology according to a second embodiment of the present invention is described.

It is assumed that the data elements in Table 1 need to be sent from a client, the length of a fingerprint generated by a fingerprint algorithm is 8 bytes, and FPLimit is set to 20 bytes. The third column in the Table 1 lists fingerprints, and it should be noted that fingerprint calculation is only performed for data elements with a length longer than or equal to the FPLimit (20 bytes). It also should be noted that, if the data element is 8 bytes, additional bytes such as zeros are added to the data element till the combined length of the data element and the added zeros reaches 20 bytes as listed by the fourth column in the Table 1. When the server finds a data item of 20 bytes, the data item is directly truncated to data of 8 bytes, and the data of 8 bytes is treated as a data element.

TABLE 1

| LUID | Data element | FingerPrint | Adding Zeros |
|---|---|---|---|
| 1012 | Tom | — | — |
| 1013 | BEGIN: VCARD VERSION: 2.1 EMAIL: aaa@bbb.com TEL; HOME: (123) 456-789 END: VCARD | 0xBDEFE0FFAAFFBBAA | — |
| 1014 | Bike | — | — |
| 1015 | A File with length 10000 bytes | 0xAAEF3111577566DD | — |
| 1017 | abcd.com | — | abcd.com000000000000 |

In the step 100, the client sends PKG 1 to the server. The PKG 1 is an initial package, which carries information of synchronization negotiation parameters, including synchronization direction, synchronization behavior, ID validity, ChangeLog validity, and so on. It is well known to persons skilled in the art, and the details will not be given hereinafter. In this embodiment of the present invention, PKG 1 sent by the client to the server further includes the FPlimit.

Pkg#1:
<FPLimit>20</FPLimit>

In the step 101, the server receives PKG 1 and stores the FPLimit. After determining based on preset rules, the server returns agreed or changed synchronization parameters.

In the step 102, the client sends PKG 3, and according to Table 1, if a fingerprint is found, the ID and the fingerprint are sent; if no fingerprint is found, the ID and the data element are sent.

After the server receives PKG 3, if the length of the received data item is shorter than the fingerprint length (8 bytes), or is longer than 8 bytes and shorter than 20 bytes, it can be directly determined that the received data item is a data element, and it is directly compared with the data element stored on the server. If the data item's length is 8 bytes, the data item is compared with the fingerprint stored on the server. If the length of the data item is 20 bytes, the data item is truncated to 8 bytes, and then the data element of 8 bytes is compared with the data element stored on the server.

Data items 1012 and 1014 may be determined as data elements, and are compared with their respective corresponding data elements stored on the server. If a data element and its corresponding data element are different, and the data element on the client is to be based on in a collision strategy, subsequent processes can be directly performed, and the server does not need to notify the client to send the two data elements via PKG 4.

For the data item 1017 which has a length of 20 bytes, the data item is truncated to 8 bytes and then the data element of 8 bytes is compared with the corresponding data element, and subsequent processes are implemented afterwards. If the two data elements are the same, it indicates that the data element on the server and the data element on the client are the same, and the server does not need to update the data element. If the data elements are different, it indicates that the data element is changed. At this time, a collision detection strategy is checked by the server, and if the data element on the server is to be based on according to the collision detection strategy, the server does not need to update the data element either. If the data element on the client is to be based on according to the collision detection strategy, the server updates the stored data element according to the data element sent by the client.

For data items 1013 and 1015, since the length of the data items is 8 bytes, the data item is compared with the fingerprint on the server, and subsequent processes are implemented. If the fingerprints are the same, it indicates that the data element on the server and the data element on the client are the same, and the client does not need to send the data element. If the fingerprints are different, it indicates that the data element is changed. At this time, a collision detection strategy is checked by the server, and if the data element on the server is to be based on, the client does not need to send the data element either. If the data element on the client is to be based on, in the step 103, the server instructs the client to send the data element. In this manner, some unnecessary data transmission can be avoided by comparing the fingerprints, and thus the traffic is reduced.

The steps thereafter are the same as those in the first embodiment, which is also well known to persons skilled in the art, and the details will not be given herein again.

Further referring to FIG. 2, a method for realizing a fingerprint technology according to a third embodiment of the present invention is described.

It is assumed that the data elements in Table 2 need to be sent from the client. The third column in Table 2 is an identifier FPFlag, and the values in the column are set by the device. "0" represents sending the data element, and the other values represent that fingerprints are sent, and indicate different fingerprint algorithms. Table 3 shows a set of fingerprint algorithms supported by a client and a server through negotiation.

TABLE 2

| LUID | Data element | FPFlag |
|------|--------------|--------|
| 1012 | Tom | 0 |
| 1013 | BEGIN: VCARD<br>VERSION: 2.1<br>EMAIL: aaa@bbb.com<br>TEL; HOME: (123) 456-789<br>END: VCARD | 1 |
| 1014 | Bike | 0 |
| 1015 | A File with length 10000 bytes | 3 |
| 1017 | abcd.com | 0 |

TABLE 3

| Value | Description |
|-------|-------------|
| 1 | Changed Log |
| 2 | Changed Count |
| 3 | Hash |
| 4 | Partial Fingerprint Calculation is performed for data elements (Sub-Item specific) |

In the step 100, the client sends PKG 1 to the server. The PKG 1 is an initial package, which carries information of synchronization negotiation parameters, including synchronization direction, synchronization behavior, ID validity, ChangeLog validity, and so on. It is well known to persons skilled in the art, and the details will not be given here.

Pkg#1:
<FPLimit>20</FPLimit>

In the step 101, after determining based on preset rules, the server returns agreed or changed synchronization parameters.

In the step 102, the client sends PKG 3, which includes a data item. According to Table 2, if FPFlag≠0, fingerprint calculation is performed for the data element, and the ID and the fingerprint are sent; if FPFlag=0, the ID and the data element are sent. It should be noted that, the values of FPFlag are determined according to the result whether the length value of the data element is greater than or equal to the preset minimum length.

After receiving the PKG 3, according to the values of FPFlag, the server determines that the received 1012, 1014, and 1017 are the data elements. Comparing the data elements with the ones stored on the server, if the two corresponding elements are different and the client is superior in a collision strategy, subsequent processes can be directly performed, and the server does not need to notify the client to send data element via PKG 4.

In 1013 and 1015, fingerprints are received, in which 1013 is a fingerprint obtained through Change Log algorithm, and 1015 is a fingerprint obtained through Hash algorithm Therefore, the fingerprints are compared with the corresponding ones stored on the server, and subsequent processes are implemented. If the two corresponding fingerprints are the same, it indicates that the data element on the server and the data element on the client are the same, and the client does not need to send the data element. If the two fingerprints are different, it indicates that the data element is changed. At this time, a collision detection strategy is checked by the server, and if the data element on the server is to be based on according to the collision detection strategy, the client does not need to send the data element either. If the data element on the client is to be based on according to the collision detection strategy, in the step 103, the server instructs the client to send the data element. In this manner, some unnecessary data transmission can be avoided by comparing the fingerprints, and thus the traffic is reduced.

The steps thereafter are the same with those in the first embodiment, which is also well known to persons skilled in the art, and the details will not be given herein again.

Figure 3:
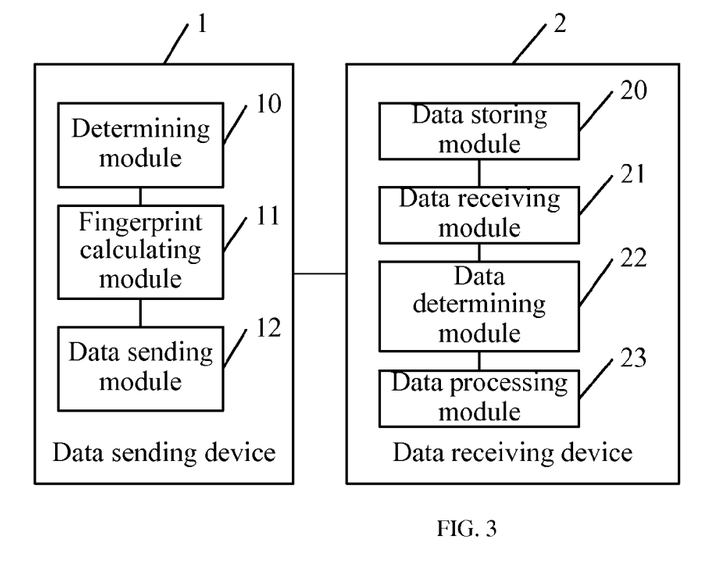
FIG. 3 is a schematic structural diagram of a system for realizing a fingerprint technology according to an embodiment of the present invention.

FIG. 3 is a schematic structural diagram of a system for realizing a fingerprint technology according to embodiments of the present invention.

The system includes a data sending device 1 and a data receiving device 2.

The data sending device 1 is configured to determine, according to one or more preset rules, whether a corresponding fingerprint needs to be generated based on a data element. If it is determined that the corresponding fingerprint needs to be generated, fingerprint calculation is performed for the data element, and an obtained fingerprint is sent to the data receiving device 2. If it is determined that the corresponding fingerprint does not need to be generated, a data element is sent to the data receiving device 2.

Specifically, the data sending device 1 includes a determining module 10, a fingerprint calculating module 11, and a data sending module 12. The structures and functions of these modules will be described in detail below with reference to FIG. 4.

The data receiving device 2 is configured to receive the data item from the data sending device 1, and determine whether the data item is a fingerprint or a data element based on one or more preset rules. If the data item is a fingerprint, the fingerprint is compared with a stored fingerprint, and subsequent processes are implemented according to a comparison result. If the data item is a data element, the data element is compared with a stored data element, and subsequent processes are implemented according to a comparison result.

Specifically, the data receiving device 2 includes a data storing module 20, a data receiving module 21, a data determining module 22, and a data processing module 23. The structures and functions of these modules will be described in detail below with reference to FIG. 5.

Figure 4:
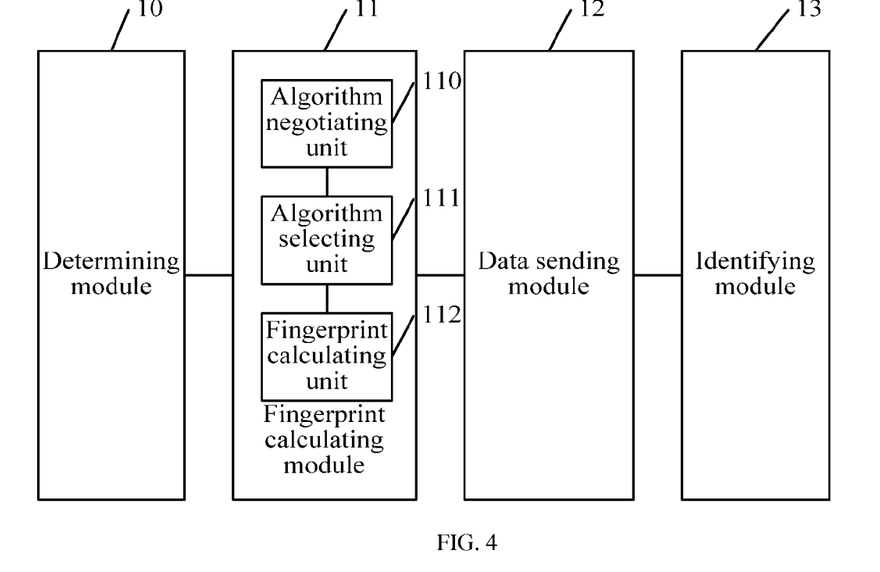
FIG. 4 is a schematic structural diagram of a data sending device according to an embodiment of the present invention.

FIG. 4 is a structural diagram of the data sending device according to an embodiment of the present invention.

The embodiment of the present invention is described by taking a client as the data sending device.

The client includes the determining module 10, the fingerprint calculating module 11, and the data sending module 12.

The determining module 10 is configured to determine whether a length value of a data element is greater than or equal to a preset minimum length value. It should be noted that, the preset minimum length value on the client is indicated with an identifier FPLimit. The FPLimit is an integer, which indicates that a corresponding fingerprint is generated according to the data element only when the length of the data element is longer than or equal to a length specified by the FPLimit.

The fingerprint calculating module 11 is configured to generate a corresponding fingerprint based on the data element, that is, to perform fingerprint calculation for the data element, when the determining module determines that the length value of the data element is greater than or equal to the preset minimum length value. The set of fingerprint algorithms supported by the client and the server may be determined through a negotiation. During the DS, the client and the server select a sub-set of fingerprint algorithms supported by both sides from the set of supported fingerprint algorithms. When fingerprint calculation is needed for the data element, a fingerprint algorithm is selected from the sub-set to perform the fingerprint calculation, and an obtained fingerprint is sent to the server.

The data sending module 12 is configured to send the fingerprint generated by the fingerprint calculating module 11 to the data receiving device; or to send the data element to the data receiving device when the determining module 10 determines that the length value of the data element is smaller than the preset minimum length value. If the length of the data element is equal to the preset fingerprint length, zeros are added to the data element to make the combined length of the data element and the added zeros equals to the preset minimum length value FPLimit, and then the data element with the added zeros is sent to the data receiving device. Herein, the data receiving device is a server.

Optionally, the data sending device (that is, the client 1) further includes an identifying module 13, configured to add an identifier FPFlag to the data item sent by the data sending module 12 to the data receiving device. The identifier FPFlag indicates whether the data item is the fingerprint obtained through fingerprint calculation or the data element.

The fingerprint calculating module 11 includes an algorithm negotiating unit 110, an algorithm selecting unit 111, and a fingerprint calculating unit 112.

The algorithm negotiating unit 110 is configured to negotiate with the data receiving device over the set of fingerprint algorithms supported by both sides. The set of fingerprint algorithms supported by both sides through the negotiation between the client and the server is as shown in Table 3.

The algorithm selecting unit 111 is configured to select a fingerprint algorithm from the set of fingerprint algorithms supported by both sides to calculate the data element when fingerprint calculation needs to be performed for the data element.

The fingerprint calculating unit 112 is configured to perform fingerprint calculation for the data element that needs to generate a fingerprint with the algorithm selected by the algorithm selecting unit 111. The type of an algorithm used when the fingerprint calculation is performed on the data element is indicated by the identifier.

Figure 5:
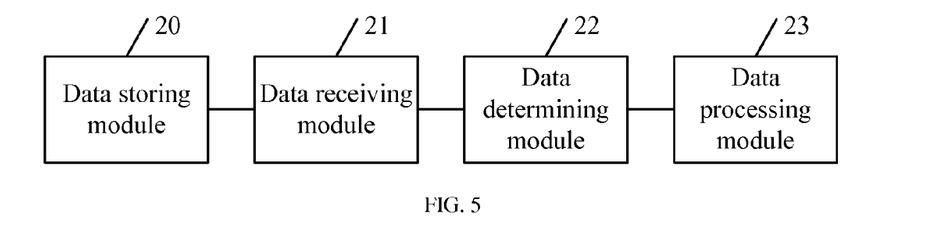
FIG. 5 is a schematic structural diagram of a data receiving device according to an embodiment of the present invention.

FIG. 5 is a structural diagram of the data receiving device according to an embodiment of the present invention.

The embodiment of the present invention is described by taking a server as the data receiving device.

The server includes the data storing module 20, the data receiving module 21, the data determining module 22, and the data processing module 23.

The data storing module 20 is configured to store a data element or a fingerprint, in which the data element or fingerprint is used to be compared with a received data element or fingerprint, so as to determine whether the received data element or the data element corresponding to the received fingerprint is changed.

The data receiving module 21 is configured to receive a data item sent from the data sending device (that is, the client).

The data determining module 22 is configured to determine whether the data item received by the data receiving module 21 is a fingerprint or a data element. If the length of the received data item is shorter than the preset fingerprint length, or is longer than the preset fingerprint length and shorter than the preset minimum length value, it can be directly determined that it is the data element. If the data item's length equals the preset fingerprint length, it is determined that the data item is a fingerprint. If the data item's length equals the preset minimum length value, it is determined that the data item is a data element with added zeros, and the data item is truncated to the preset fingerprint length value, and then the data element derived by truncating the data item is compared with the data elements stored in the data storing module 20.

It should be noted that, the set of the fingerprint algorithms supported by the client and the server may be determined through a negotiation. The client and the server select a subset of fingerprint algorithms supported by both sides from the set of supported fingerprint algorithms. When fingerprint calculation is needed for the data element, a fingerprint algorithm is selected from the sub-set to perform the calculation, and is optionally identified by FPFlag. The obtained fingerprint is sent to the server. FPFlag is an integer. If FPFlag=0, it indicates that the data element is to be sent. If FPFlag≠0, it indicates that the fingerprint of the data element is to be sent. Different values of FPFlag are adopted to identify different fingerprint algorithms.

The data processing module 23 is configured to compare the fingerprint with a stored fingerprint when the data determining module 22 determines that the received data item is the fingerprint, and subsequent processes are implemented according to a comparison result. If the data item is a data element, the data element is compared with data element stored in the data storing module 20. If the length of the data item equals the minimum present length value, the data item is truncated to the preset fingerprint length value and then the data element derived by truncating the data item is compared with the data element stored in the data storing module 20, and subsequent processes are implemented according to a comparison result.

Figure 6:
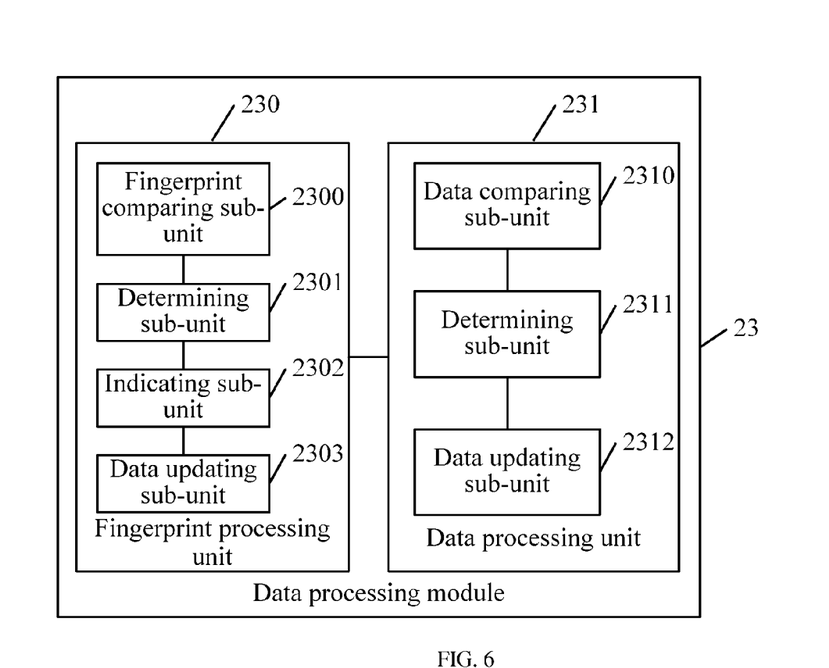
FIG. 6 is a schematic structural diagram of a data processing module in the data receiving device as shown in FIG. 5.

FIG. 6 is a structural diagram of the data processing module 23 in the data receiving device 2 as shown in FIG. 5. As shown in FIG. 6, the data processing module 23 includes a fingerprint processing unit 230 and a data processing unit 231.

The fingerprint processing unit 230 is configured to compare the fingerprint with the one stored in the data storing module 20 when the data determining module 22 determines that the data item received by the data receiving module 21 is a fingerprint, and implement subsequent processes according to the comparison result.

The data processing unit 231 is configured to compare the data element with the data element stored in the data storing module 20 when the data determining module 22 determines that the data item received by the data receiving module 21 is a data element, and implement subsequent processes according to the comparison result.

The fingerprint processing unit 230 includes a fingerprint comparing sub-unit 2300.

The fingerprint comparing sub-unit 2300 is configured to compare the fingerprint with the stored fingerprint when the data determining module 22 determines that the received data item is the fingerprint. If the two fingerprints are the same, the data element stored in the data storing module 20 does not need to be updated; if the two fingerprints are different, it indicates that the data element of the data sending device is changed.

The fingerprint processing unit 230 further includes a determining sub-unit 2301, configured to check a collision detection strategy and determine whether the data sending device needs to send the data element. If the data element on the data receiving device is to be based on, the data sending device does not need to send the data element. If the data element on the data sending device is to be based on, the fingerprint processing unit 230 further includes an instructing sub-unit 2302 and a data updating sub-unit 2303.

The instructing sub-unit 2302 is configured to instruct the data sending device to send the data element.

The data updating sub-unit 2303 is configured to update the data element stored in the data storage unit 20 with the received data element.

The data processing unit 231 includes a data comparing sub-unit 2310.

The data comparing sub-unit 2310 is configured to compare the data element with the data element stored in the data storing module 20 when the data determining module 22 determines that the received data item is a data element. If the two fingerprints are the same, the data element stored in the data storing module 20 does not need to be updated; if the two fingerprints are different, it indicates that the data element of the data sending device is changed.

The data processing unit 231 further includes a determining sub-unit 2311, configured to check a collision detection strategy and determine whether the data sending device needs to send the data element. If the data of the data receiving device is to be based on, the data element stored in the data storage device 20 does not need to be updated. If the data of the data sending device is to be based on, the data processing unit 231 further includes a data updating sub-unit 2312.

The data updating sub-module 2312 is configured to update the data element stored in the data storage unit 20 with the received data element.

Through the descriptions of the preceding embodiments, those skilled in the art may understand that the present invention may be implemented by hardware only or by software and a necessary universal hardware platform. Based on such understandings, all or part of the technical solution under the present invention may be essentially embodied in the form of a software product. The software product may be stored in a storage medium, which can be a magnetic disk, a Compact Disk Read-Only Memory (CD-ROM), a Read-Only Memory (ROM) or a Random Access Memory (RAM). The software product includes a number of instructions that enable a computer device (personal computer, server, or network device) to execute the methods provided in the embodiments of the present invention.

In the method and system for realizing a fingerprint technology, the data sending device, and the data receiving device provided in the embodiments of the present invention, by presetting a minimum length for the data element that requires fingerprint calculation, whether a corresponding fingerprint needs to be generated for the data element is determined, and whether the fingerprint or the data element is sent is determined accordingly. Moreover, an identifier may be set for each data item to notify the receiver whether a fingerprint or a data element is sent, and to notify the receiver of the used fingerprint algorithm. In this way, fingerprint calculation for data elements with short length and unnecessary data transmission during the DS are avoided, and the efficiency of the DS is improved.

It should be noted that the above descriptions are merely exemplary embodiments of the present invention, and those skilled in the art may make various improvements and refinements without departing from the spirit of the invention. All such modifications and refinements are intended to be covered by the present invention.

What is claimed is:

1. A method for sending data elements, comprising:
   determining, by a data sending device, whether a length of a data element is greater than or equal to a preset length;
   based on the determining, if the length of the data element is greater than or equal to the preset length, performing, by the data sending device, a fingerprint calculation for the data element to obtain a fingerprint of the data element with a predetermined length, and sending, by the data sending device, the fingerprint of the data element as a data item to a data receiving device; and
   based on the determining, if the length of the data element is smaller than the preset length, sending, by the data sending device, the data element as a data item to the data receiving device;
   wherein the predetermined length of the fingerprint is smaller than the preset length.

2. The method according to claim 1, wherein the method further comprises:
   if the length of the data element equals to the length of the fingerprint of the data element, appending, by the data sending device, one or more data bytes to the data element till the length of the data element and appended data bytes combined equals to the preset length; and
   sending, by the data sending device, the appended data element as the data item to the data receiving device.

3. The method according to claim 1, further comprising:
   negotiating with the data receiving device, by the data sending device, to determine a set of fingerprint algorithms supported by both sides; and
   when the fingerprint calculation needs to be performed for the data element, selecting, by the data sending device, a fingerprint algorithm from the set of fingerprint algorithms supported by the both sides, and performing the fingerprint calculation for the data element with the selected fingerprint algorithm,
   wherein a type of the selected fingerprint algorithm used in the fingerprint calculation is also indicated by the identifier.

4. A method for receiving data elements, comprising:
   receiving, by a data receiving device, a data item from a data sending device;
   determining, by the data receiving device, whether a length of the data item is equal to a predetermined length of a fingerprint generated by a fingerprint calculation;
   based on the determining, if the length of the data item equals the predetermined length of the fingerprint, the data item is a fingerprint of the data element, and comparing, by the data receiving device, the fingerprint with a fingerprint of a corresponding data element stored in the data receiving device; and
   based on the determining, if the length of the data item does not equal the predetermined length of the fingerprint, the data item is a data element, and comparing, by the data receiving device, the data element with a corresponding data element stored in the data receiving device.

5. The method according to claim 4, wherein the method further comprises:
   if the length of the data item equals to a preset length, truncating, by the data receiving device, the data item to the predetermined length of the fingerprint to obtain the data element;
   wherein the predetermined length of the fingerprint is smaller than the preset length.

6. The method according to claim 4, wherein after comparing the fingerprint of the data element with the fingerprint of the corresponding data element stored in the data receiving device, the method further comprises:
   if the fingerprint of the data element and the fingerprint of the corresponding data element stored in the data receiving device are the same, taking no further actions; and
   if the fingerprint of the data element and the fingerprint of the corresponding data element stored in the data receiving device are different, determining, by the data receiving device, whether to update the corresponding data element stored in the data receiving device based on a collision detection strategy,
   wherein:
   if, according to the collision detection strategy, the corresponding data element stored in the data receiving device prevails, the data receiving device takes no further actions; and
   if, according to the collision detection strategy, the data element received from the data sending device prevails, the data receiving device instructs the data sending device to send the data element to the data receiving device, and after receiving the data element from the data sending device, the data receiving device updates the stored corresponding data element with the received data element.

7. The method according to claim 4, wherein after comparing the data element with a corresponding data element stored in the data receiving device, the method further comprises:
   if the data element and the corresponding data element stored in the data receiving device are the same, taking no further actions; and
   if the data element and the corresponding data element stored in the data receiving device are different, determining whether to update the corresponding data element stored in the data receiving device based on a collision detection strategy,
   wherein:
   if, according to the collision detection strategy, the corresponding data element stored in the data receiving device prevails, the data receiving device takes no further actions; and
   if, according to the collision detection strategy, the data element received from the data sending device prevails, the data receiving device updates the corresponding data element stored in the data receiving device with the received data element.

8. A data sending device, comprising:
   a data storage, configured to store a data element and/or a fingerprint of the data element,
   a data processor, configured to:
   determine whether a length of the data element is greater than or equal to a preset length; and
   based on the determining, generate the fingerprint of the data element if the length of the data element is greater than or equal to a preset length; and
   a data transmitter, configured to:
   send the fingerprint of the data element as a data item to a data receiving device; and
   send the data element as a data item to the data receiving device if the length of the data element is smaller than the preset length based on the determining;
   wherein the length of the fingerprint of the data element is smaller than the preset length value.

9. The data sending device according to claim 8, wherein if the length of the data element equals to the length of the fingerprint of the data element, the data processor is further configured to:
- append one or more data bytes to the data element till a combined length of the data element and the appended data bytes equals to the preset length; and the data transmitter is further configured to:
- send the appended data element as the data item to the data receiving device.

10. The data sending device according to claim 8, wherein the data processor is further configured to:
- negotiate with the data receiving device to determine a set of fingerprint algorithms supported by both the data sending device and the data receiving device;
- select a fingerprint algorithm from the set of fingerprint algorithms supported by both devices if the fingerprint calculation needs to be performed for the data element; and
- perform the fingerprint calculation with the selected fingerprint algorithm for the data element to obtain the fingerprint of the data element,
- wherein a type of the selected fingerprint algorithm is also indicated by the identifier sent to the data receiving device.

11. A data receiving device, comprising:
- a data storage, configured to store data elements and/or fingerprints of the data elements;
- a data receiver, configured to receive a data item from a data sending device, the data item is a data element or a fingerprint of the data element; and
- a data processor, configured to:
  - determine whether a length of the received data item is equal to a predetermined length of a fingerprint generated by a fingerprint calculation;
  - based on the determining, if the length of the received data item equals the predetermined length of the fingerprint, the received data item is a fingerprint of the data element, and compare the fingerprint with a fingerprint of a corresponding data element stored in the data storage; and
  - based on the determining if the length of the received data item does not equal the predetermined length of the fingerprint, the received data item is a data element, and compare the data element with a corresponding data element stored in the data storage.

12. The data receiving device according to claim 11, wherein if the length of the data item equals to a preset length, the data processor is further configured to:
- truncate the data item to the length of the fingerprint to obtain the data element;
- wherein the length of the fingerprint is smaller than the preset length.

13. The data receiving device according to claim 11, wherein in comparing the received fingerprint of the data element with a fingerprint of a corresponding data element stored in the data storage, the data processor is configured to:
- if the received fingerprint of the data element and the stored fingerprint of the corresponding data element are the same, take no further actions; and
- if the received fingerprint of the data element and the stored fingerprint of the corresponding data element are different, determine whether to update the corresponding data element stored in the data receiving device based on a collision detection strategy, wherein:
- if, according to the collision detection strategy, the corresponding data element stored in the data receiving device prevails, the data processor takes no further actions; and
- if, according to the collision detection strategy, the data element received from the data sending device prevails, the data processor is further configured to instruct the data sending device to send the data element to the data receiving device, and after receiving the data element from the data sending device, update the stored corresponding data element with the received data element.

14. The data receiving device according to claim 11, wherein in comparing the received data element with a corresponding data element stored in the data storage, the data processor is configured to:
- if the received data element and the corresponding data element stored in the data storage are the same, take no further actions; and
- if the received data element and the corresponding data element stored in the data storage are different, determine whether to update the corresponding data element stored in the data receiving device based on a collision detection strategy, wherein:
- if, according to the collision detection strategy, the data element stored in the data receiving device prevails, the data processor takes no further actions; and
- if, according to the collision detection strategy, the data element received from the data sending device prevails, the data processor is further configured to update the corresponding data element stored in the data receiving device with the received data element.

15. A system for sending and receiving data elements, comprising:
- a data sending device, configured to:
  - determine whether a length of a data element is greater than or equal to a preset length; based on the determining, generate a fingerprint of the data element if the length of the data element is greater than or equal to the preset length, and send the fingerprint of the data element as a data item to a data receiving device, or based on the determining, send the data element to the data receiving device if the length of the data element is smaller than the preset length; and
- the data receiving device, configured to receive a data item sent by the data sending device; determine whether the data item received is a fingerprint of a data element or a data element based on one or more preset rules; store the data element or the fingerprint of the data element; and based on the determining, if the received data item is a fingerprint of a data element, compare the fingerprint of the data element with a fingerprint of a corresponding data element stored in the data receiving device, or based on the determining, if the received data item is a data element, compare the data element with a corresponding data element stored in the data receiving device;
- wherein the length of the fingerprint is smaller than the preset length.

* * * * *

UNITED STATES PATENT AND TRADEMARK OFFICE
CERTIFICATE OF CORRECTION

PATENT NO. : 8,706,746 B2  
APPLICATION NO. : 12/840305  
DATED : April 22, 2014  
INVENTOR(S) : Liu et al.

Page 1 of 1

It is certified that error appears in the above-identified patent and that said Letters Patent is hereby corrected as shown below:

*Title page, (75) Applicant's City of Residence "Shenzhen (JP)" should read --Shenzhen (CN)--.*

Signed and Sealed this  
Twenty-third Day of September, 2014

Michelle K. Lee  
*Deputy Director of the United States Patent and Trademark Office*